July 12, 1955  A. R. SPICACCI  2,712,969
BEARING

Filed Oct. 6, 1953  2 Sheets-Sheet 1

INVENTOR
ATTILIO R. SPICACCI
BY M. W. Gould
ATTORNEY

INVENTOR
ATTILIO R. SPICACCI
BY *M. W. Gould*
ATTORNEY

United States Patent Office 2,712,969
Patented July 12, 1955

2,712,969

BEARING

Attilio Regulus Spicacci, Lancaster, Pa.

Application October 6, 1953, Serial No. 384,410

7 Claims. (Cl. 308—187.1)

This invention relates to bearings as applied to disk harrows and the like.

In applications of this sort both dust and moisture abounds in the farm equipment shops and the farms. Therefore, it is necessary to protect the bearing in handling during the assembly and in the operation of the disk harrow.

One of the objects of the invention, therefore, is to provide a single unit containing the bearing, housing, and seals which can cope with the dust and moisture conditions mentioned above.

Another object of the invention is to provide a shell to retain the bearing proper and, together with the inner ring, form a lateral cavity on each side of the bearing. These cavities are covered by side plates preferably fixed to the inner ring and have a contact seal with the inner wall of the said lateral cavities.

Another object is to fill the said cavities with a plastic sealing compound, such as grease, which will impede the entrance of contaminants into the bearing.

Another object of the invention is to provide on the outside diameter of the shell, facilities to hold the unit in a suitable bracket attached to the disk harrow.

A further object of the present invention is to provide a bearing which may be formed from two identically formed shells secured together to form the bearing housing, thus insuring simplicity of manufacture.

It is a further object of the present invention to provide a simple seal by which the lubricant may be retained within the bearing housing and the dirt, moisture and other foreign matter kept out.

It is a still further object of the invention to provide a structure which will readily adapt itself to either a spherical outside diameter of the bearing mounting or a flat cylindrical bearing mounting.

The invention is illustrated in the accompanying drawings in which.

Figure 1:
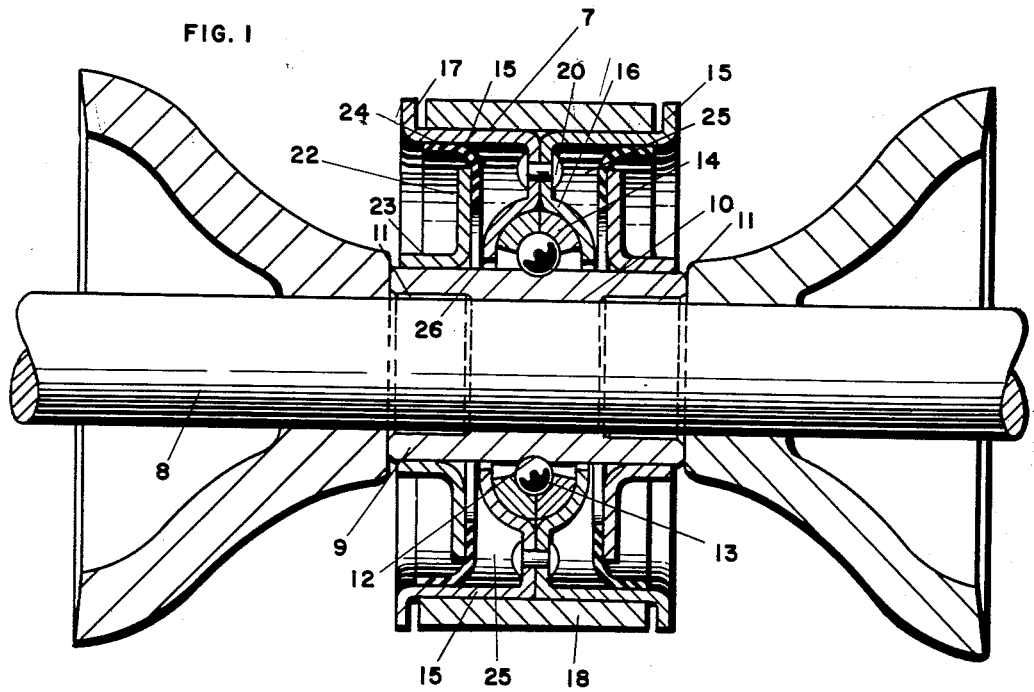
Figure 1 shows a longitudinal cross sectional view of the bearing together with two spacers fitted on each side of the bearing.
Figure 2:
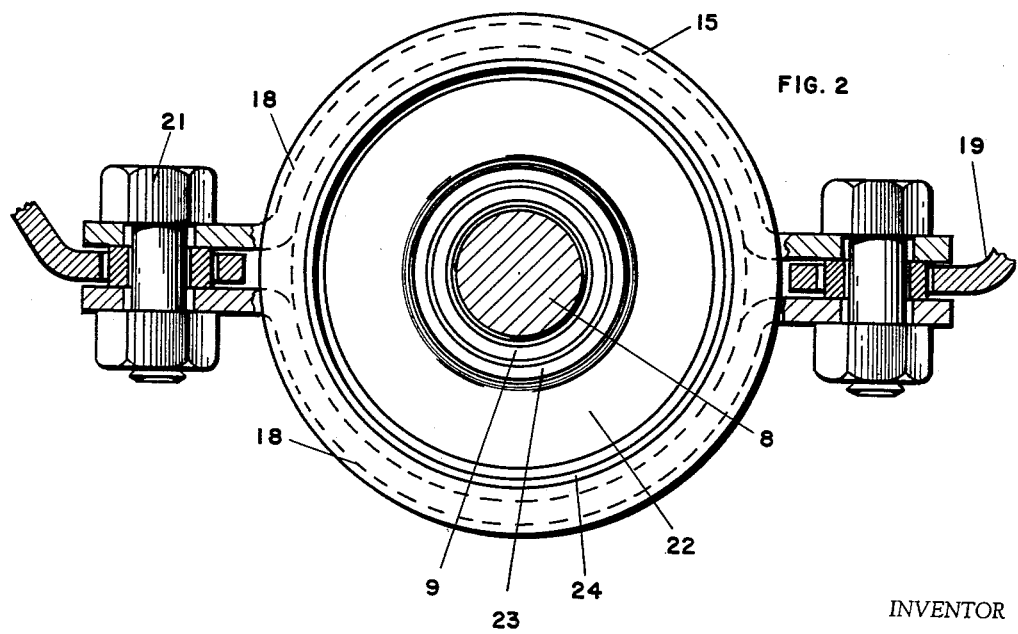
Figure 2 is an end view of the bearing.

Referring first to Figures 1 and 2, a shaft 8 adapted to support the disks and spacer cups has mounted thereon a sleeve 9 formed with an inner shaft contacting surface 10 and recessed portions 11 at each end. The outer surface of the sleeve 9 is formed with a central annular groove 12 serving as the inner race of the bearing. Balls 13 are carried between the inner race 12 and divided outer race 14.

A pair of identical shells 15 is stamped or pressed into the desired form. Each of these shells is formed with a central opening, an annular grooved portion directly adjacent said opening, a flat web portion and thereafter bent at right angles to form, when joined to a like disk, the strap supporting cylindrical surface. An outer rim 17 completes the shell and forms a retaining lip for the straps 18 supporting the bearing on the frame 19. The shells are joined by rivets 20 passing through the web portion, bringing the annular grooves together to form a housing for the split outer race 14. The joining of the disks brings the outer bent portions in alignment to form a cylindrical surface to receive the straps 18. The straps 18 are secured to the framework 19 by bolts 21.

Shields 22 are formed with an annular hub 23 which engages the sleeve 9 and rotates with said sleeve. Attached to the shield by cement or other suitable means is a rubber ring 24 which extends upward from the sleeve to engage the inner wall of the bearing housing. The ring 24 is formed of an extended length to provide a good contact with the inner wall of the shell housing so that said rubber ring will remain in contact even though the bearing should cant slightly in its support.

The shields 22 in contacting the inner wall of the bearing housing form a pair of grease compartments 25. The central opening in the shells is slightly larger than the sleeve 9 to provide an annular opening 26 to admit grease from the grease compartments to the balls and races. The grease carried in the compartments 25 not only serves to lubricate the bearing, but also to prevent any dust or dirt that might pass the shield from working into the races or coming in contact with the balls.

Figure 3:
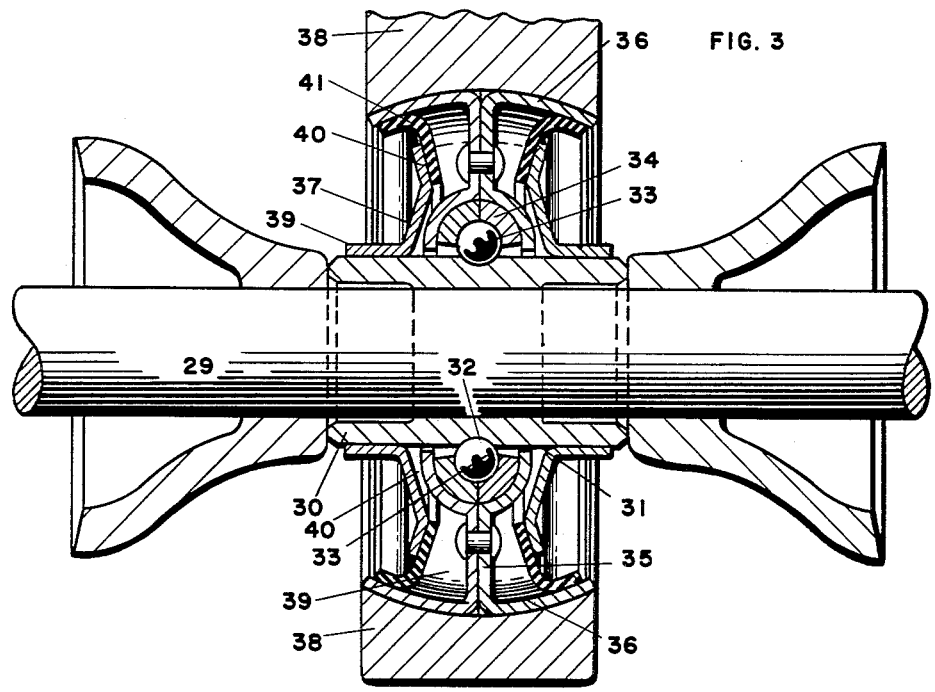
Figure 3 is a view similar to Figure 1 showing a bearing adapted for a spherical mounting.
Figure 4:
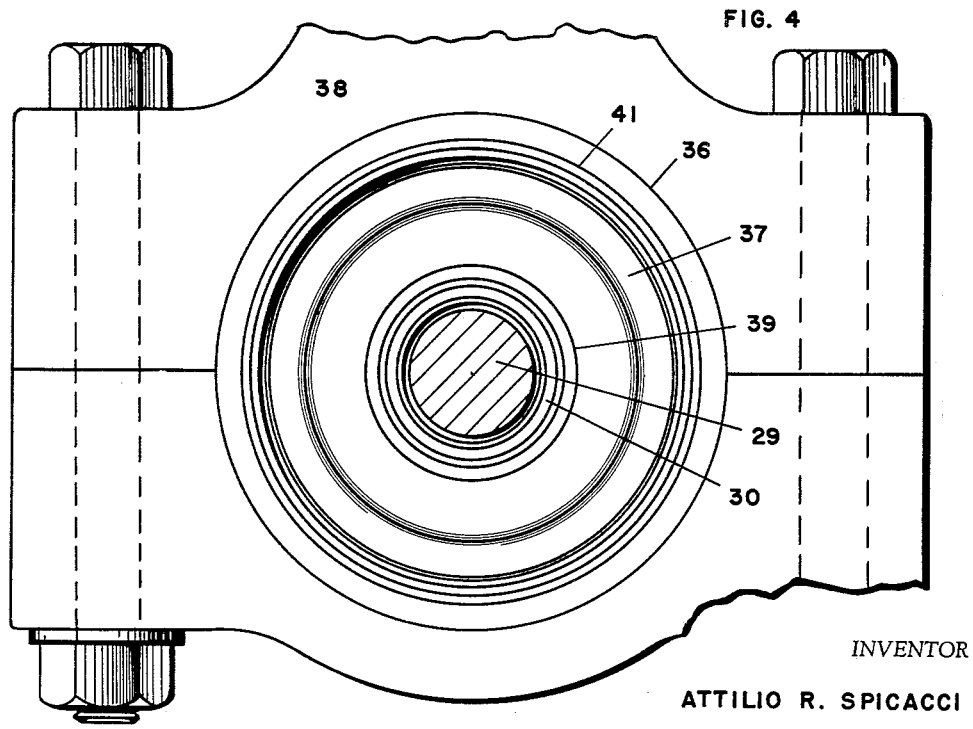
Figure 4 is an end view of the bearing shown in Figure 3.

A similar bearing is shown in Figures 3 and 4 having the sleeve 30 secured to the shaft 29 and formed with a central annular groove 32 serving as an inner race for the balls 33, an outer race 34 being housed by the pair of joined shells 35. In the outward configuration the shells differ in that their outer edge is not formed at right angles to the web and there is no retaining rim. In this variation the outer edges of the shell are bent to conform to a spherical supporting saddle 38 which is secured to the frame.

A shield 37 is similar to shield 22 except that it is bent at a slight angle to the hub portion 39 inward toward the center of the bearing for a distance of two-thirds of its width being at this point bent outward, as shown at 40. A rubber ring 41 is attached to said disk to engage the inner surface of the housing. The bending of the disk inward towards the center of the bearing permits the rubber ring 41 to have an extended engagement with the inner surface of the housing to provide a more effective seal.

The grease compartment 39' formed between the shells and the shields 37 in the modification serves more as a means for preventing the entrance of dirt or moisture than it does as an actual lubricator, the compartment 39' being substantially divided into an outer compartment and an inner compartment due to the inward bending of the shield into almost contact with the shell at the point of the outer race retainer. This restricted opening 40 also serves to prevent the entrance of foreign matter to the races and balls.

What is claimed is:

1. A bearing, comprising an inner race, an outer race, balls between said races, a pair of identical shells joined in opposed relation to form an outer race retaining means, said shells being extended to form an outer cylindrical surface to receive a supporting strap, an upstanding rim at the edges of said cylindrical surface to retain said supporting strap, and means carried by said cylindrical sleeve and contacting the inner wall of said outer cylindrical surface to form a pair of grease compartments.

2. A bearing unit comprising an inner sleeve race, an outer race, balls carried between said races, a pair of enveloping shells substantially attached to each other and holding said outer race, a pair of shields attached to the inner sleeve race, said shields together with the outer wall of the shells forming a pair of cavities, flexible end pieces on said shields contacting said shells to effectively seal said cavities, said cavities being filled with a plastic sealing compound.

3. A bearing unit comprising an inner sleeve race, an outer race, balls carried between said races, a pair of identical enveloping shells substantially attached in opposed relation to each other and holding said outer race, a pair of shields attached to the inner sleeve race said shields together with the outer wall of said shells forming a pair of cavities, flexible end pieces on said shields contacting said shells to effectively seal the cavities, said cavities being filled with a plastic sealing compound.

4. A bearing unit comprising an inner sleeve race, an outer race, balls carried between said races, a pair of identical enveloping shells substantially attached to each other and forming a support for said outer race, shields attached to the inner sleeve race said shields together with the outer wall of said shells forming a pair of cavities, rubber rings attached to the periphery of said shields and contacting said shells to effectively seal the cavities, said cavities being filled with a plastic sealing compound.

5. A bearing unit according to claim 4 in which the sealing compound is also a lubricating grease, and means permitting the entrance of said grease from said cavities to the ball carrying races.

6. A bearing unit comprising an inner sleeve race, an outer race, balls carried between said races, a pair of identical enveloping shells attached together in opposed relation and forming a support for said outer race ring and at the same time forming a pair of annular cavities opening outward, shields attached to said inner sleeve race and extending at an angle inward to a point beyond said outer race and then bent outward to substantially form the outer wall of said cavities, and flexible rings attached to said shields at their periphery and contacting said shells to effectively seal said cavities.

7. A bearing unit comprising an inner sleeve race, an outer race, balls carried between said races, a pair of identical shells joined in opposed relation and forming a housing for said outer race and extending to within close proximity to said inner sleeve race, said shells forming an outer supporting wall for said bearing unit and a pair of annular cavities opening outwardly, and means forming the outer wall of said cavities and contacting said enveloping shells to effectively seal said cavities, and a lubricating grease carried within said cavities.

References Cited in the file of this patent

UNITED STATES PATENTS

| | | |
|---|---|---|
| 2,010,499 | Smith | Aug. 6, 1935 |
| 2,022,252 | Miltenberger | Nov. 26, 1935 |